US011252409B2

(12) United States Patent
Choi et al.

(10) Patent No.: US 11,252,409 B2
(45) Date of Patent: Feb. 15, 2022

(54) TILE AND SUB-PICTURE PARTITIONING

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/815,947

(22) Filed: Mar. 11, 2020

(65) Prior Publication Data

US 2020/0296368 A1 Sep. 17, 2020

Related U.S. Application Data

(60) Provisional application No. 62/816,846, filed on Mar. 11, 2019.

(51) Int. Cl.
*H04N 19/119* (2014.01)
*H04N 19/184* (2014.01)
*H04N 19/117* (2014.01)

(52) U.S. Cl.
CPC ......... *H04N 19/119* (2014.11); *H04N 19/117* (2014.11); *H04N 19/184* (2014.11)

(58) Field of Classification Search
CPC .... H04N 19/117; H04N 19/119; H04N 19/17; H04N 19/176; H04N 19/184; H04N 21/431
See application file for complete search history.

(56) References Cited

U.S. PATENT DOCUMENTS

| 2013/0022104 | A1* | 1/2013 | Chen | H04N 19/61 |
| | | | | 375/240.02 |
| 2013/0101035 | A1* | 4/2013 | Wang | H04N 19/70 |
| | | | | 375/240.12 |
| 2015/0201202 | A1* | 7/2015 | Hattori | H04N 19/70 |
| | | | | 375/240.02 |
| 2017/0251209 | A1 | 8/2017 | Andersson et al. | |
| 2017/0289556 | A1* | 10/2017 | Hendry | H04N 19/70 |

OTHER PUBLICATIONS

International Search Report and Written Opinion dated Jun. 15, 2020 from the International Searching Authority in International Application No. PCT/US2020/021958.

* cited by examiner

*Primary Examiner* — Md N Haque
(74) *Attorney, Agent, or Firm* — Sughrue Mion, PLLC

(57) ABSTRACT

Systems and methods for decoding are provided, a method is performed by at least one processor to decode a sub-bitstream of a coded video stream, the coded video stream including a coded version of a first sub-picture and a second sub-picture of a picture, the method including decoding the first sub-picture of the picture, independently from the second sub-picture, using sub-picture and tile partitioning, wherein (i) the first sub-picture comprises a first rectangular region of the picture and the second sub-picture comprises a second rectangular region of the picture, the second rectangular region being different from the first rectangular region, (ii) the first sub-picture and the second sub-picture each include at least one tile, and (iii) the first sub-picture and the second sub-picture do not share a common tile.

18 Claims, 12 Drawing Sheets

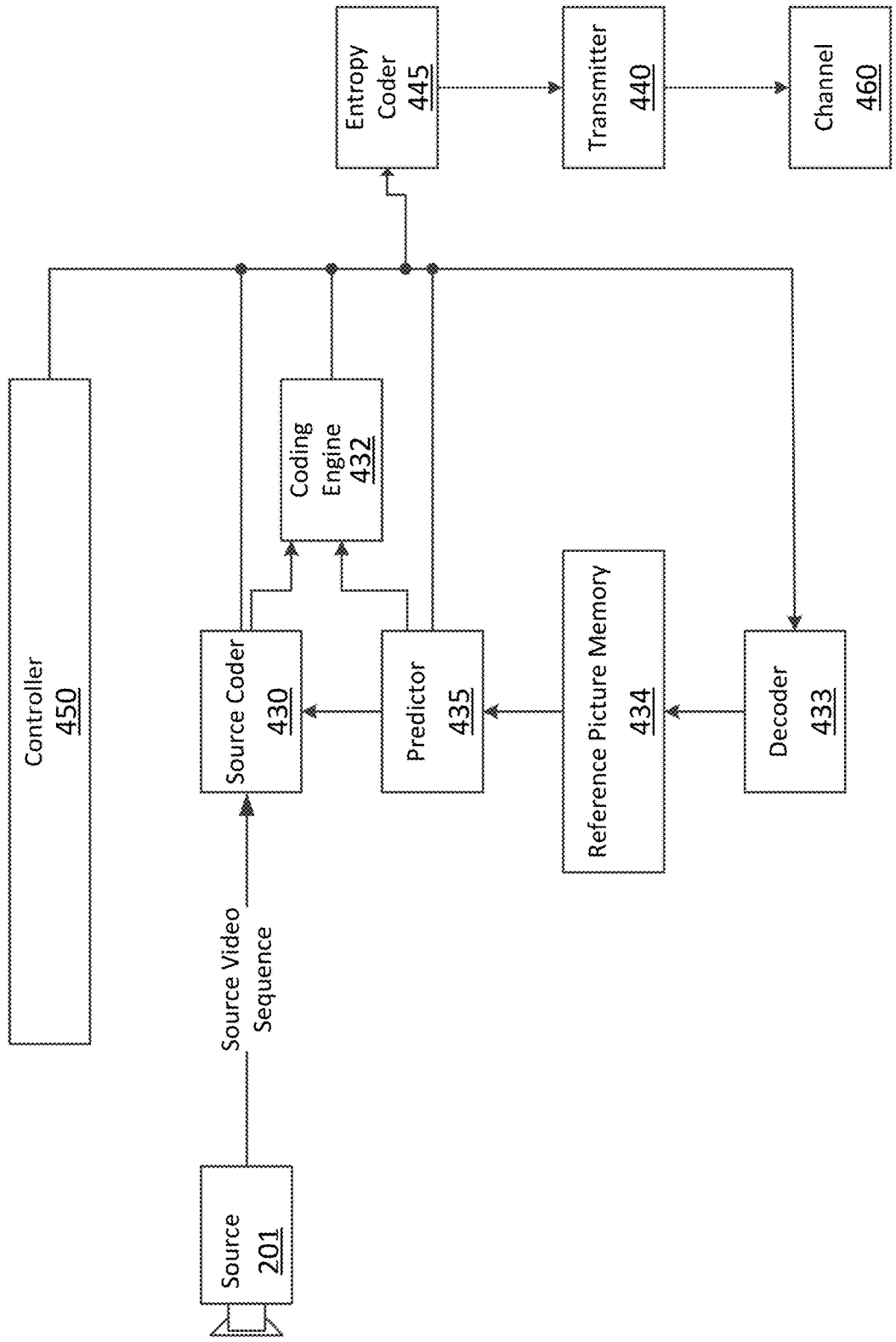

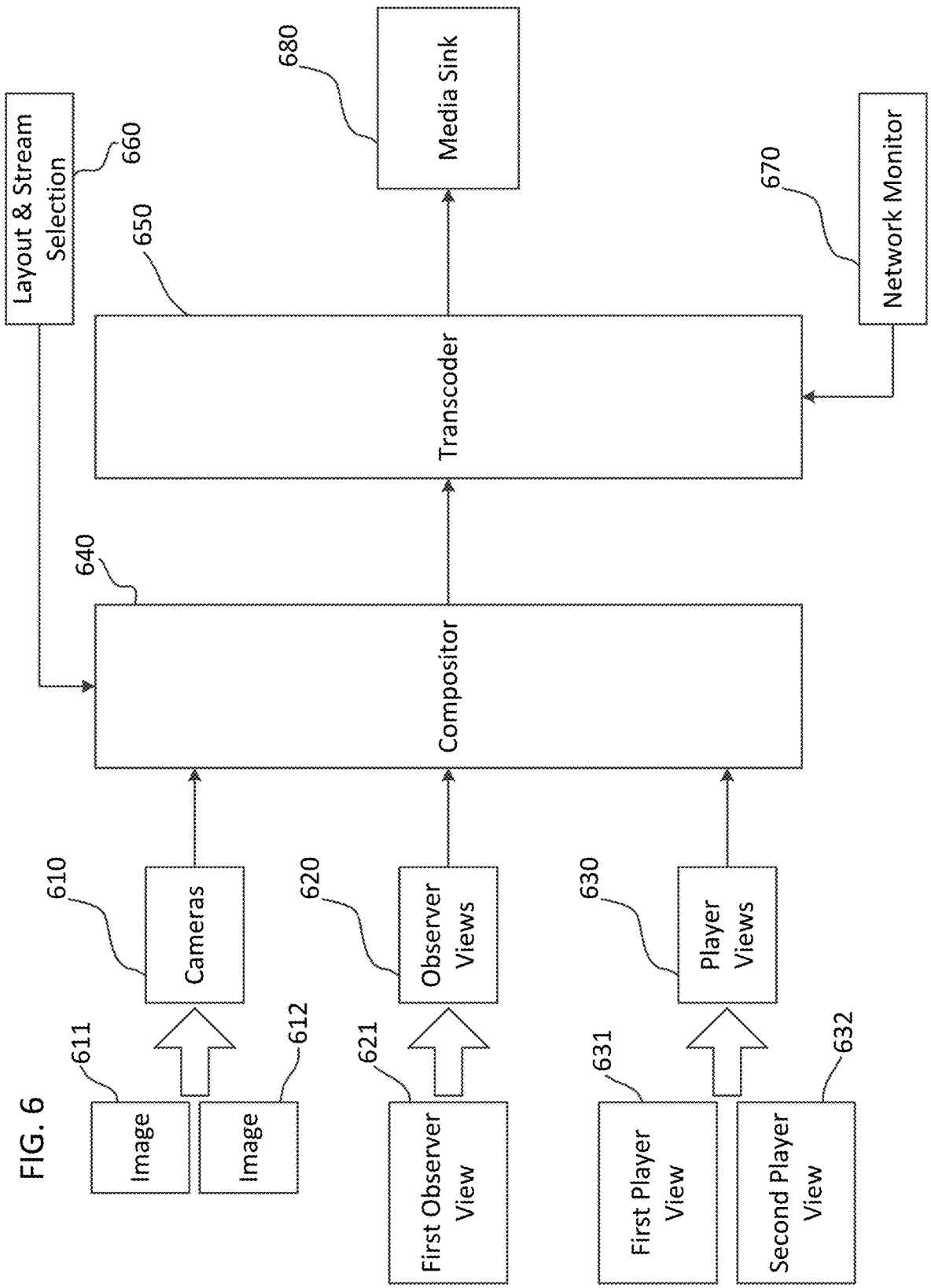

TILE AND SUB-PICTURE PARTITIONING

CROSS-REFERENCE TO RELATED APPLICATION

This application claims priority from U.S. Provisional Application No. 62/816,846, filed on Mar. 11, 2019, the disclosure of which is incorporated herein by reference in its entirety.

FIELD

This disclosure is directed to a set of advanced video coding technologies. More specifically, tile and sub-picture partitioning design.

BACKGROUND

Under development is a video coding standard informally known as Versatile Video Coding (VVC).

SUMMARY

Some embodiments of the present disclosure address problems relating to VVC and other problems.

In some embodiments, a method is provided. The method may be performed by at least one processor to decode a sub-bitstream of a coded video stream, the coded video stream including a coded version of a first sub-picture and a second sub-picture of a picture. The method comprises: receiving the sub-bitstream; and decoding the first sub-picture of the picture, independently from the second sub-picture, using sub-picture and tile partitioning, wherein (i) the first sub-picture comprises a first rectangular region of the picture and the second sub-picture comprises a second rectangular region of the picture, the second rectangular region being different from the first rectangular region, (ii) the first sub-picture and the second sub-picture each include at least one tile, and (iii) the first sub-picture and the second sub-picture do not share a common tile.

In an embodiment, the method further comprises decoding the second sub-picture of the picture, independently from the first sub-picture, using the sub-picture and tile partitioning, wherein the at least one tile of the first sub-picture is a first plurality of tiles, and the at least one tile of the second sub-picture is a second plurality of tiles. In an embodiment, the decoding of the first sub-picture is performed with a different tile scan order than the decoding of the second sub-picture. In an embodiment, the decoding of the first sub-picture and the decoding of the second sub-picture is performed using the sub-picture and tile partitioning, wherein: the first plurality of tiles of the first sub-picture are grouped into at least one first tile group, the second plurality of tiles of the second sub-picture are grouped into at least one second tile group, and no tiles of the at least one first tile group are located in the at least one second tile group. In an embodiment, one of the at least one first tile group is a non-rectangular tile group. In an embodiment, the first sub-picture is decoded in accordance with decoding technology wherein tile-group-level loop filtering control at a boundary between two tile groups of the at least one first tile group is only allowed in case where each of the two tile groups are rectangular.

In an embodiment, the receiving the sub-bitstream includes receiving the coded video stream, the coded video stream including a sequence parameter set (SPS) that includes information on how to partition sub-pictures of the picture, including the first sub-picture and the second sub-picture. In an embodiment, the coded video stream received includes a picture parameter set (PPS) that includes information on how to partition tiles of the picture, including the at least one tile of the first sub-picture and the at least one tile of the second-sub picture. In an embodiment, the coded video stream received includes an active parameter set (APS) that signals adaptive loop filter (ALF) coefficients of the first sub-picture.

In some embodiments, a decoder is provided. The decoder may be for decoding a sub-bitstream of a coded video stream, the coded video stream including a coded version of a first sub-picture and a second sub-picture of a picture. The decoder may comprise: memory configured to store computer program code; and at least one processor configured to receive the sub-bitstream, access the computer program code, and operate as instructed by the computer program code. The computer program code may include decoding code configured to cause the at least one processor to decode the first sub-picture of the picture, independently from the second sub-picture, using sub-picture and tile partitioning, wherein (i) the first sub-picture comprises a first rectangular region of the picture and the second sub-picture comprises a second rectangular region of the picture, the second rectangular region being different from the first rectangular region, (ii) the first sub-picture and the second sub-picture each include at least one tile, and (iii) the first sub-picture and the second sub-picture do not share a common tile.

In an embodiment, the decoding code is further configured to cause the at least one processor to decode the second sub-picture of the picture, independently from the first sub-picture, using the sub-picture and tile partitioning, and the at least one tile of the first sub-picture is a first plurality of tiles, and the at least one tile of the second sub-picture is a second plurality of tiles. In an embodiment, the decoding code is configured to cause the at least one processor to decode the first sub-picture with a different tile scan order than a tile scan order used to decode the second sub-picture. In an embodiment, the decoding code is configured to cause the at least one processor to decode the first sub-picture and the second sub-picture using the sub-picture and tile partitioning, wherein: the first plurality of tiles of the first sub-picture are grouped into at least one first tile group, the second plurality of tiles of the second sub-picture are grouped into at least one second tile group, and no tiles of the at least one first tile group are located in the at least one second tile group. In an embodiment, one of the at least one first tile group is a non-rectangular tile group. In an embodiment, the decoding code is configured to cause the at least one processor to decode in accordance with decoding technology wherein tile-group-level loop filtering control at a boundary between two tile groups of the at least one first tile group is only allowed in case where each of the two tile groups are rectangular.

In an embodiment, the decoder is configured to receive the coded video stream that includes the sub-bitstream, the coded video stream including a sequence parameter set (SPS) that includes first information on how to partition sub-pictures of the picture, including the first sub-picture and the second sub-picture, and the decoding code is configured to cause the at least one processor to partition the sub-pictures of the picture according to the first information. In an embodiment, the coded video stream includes a picture parameter set (PPS) that includes second information on how to partition tiles of the picture, including the at least one tile of the first sub-picture and the at least one tile of the second sub-picture, and the decoding code is configured to cause the at least one processor to partition the tiles of the picture according to the second information. In an embodiment, the coded video stream includes an active parameter set (APS) that signals adaptive loop filter (ALF) coefficients of the first sub-picture, and the decoding code is configures to cause the at least one processor to use the APS in decoding the first sub-picture.

In some embodiments, a non-transitory computer-readable medium storing computer instructions is provided. The computer instructions, when executed by at least one processor, cause the at least one processor to: decode a first sub-picture of a picture of a coded video stream, independently from a second sub-picture of the picture of the coded video stream, using sub-picture and tile partitioning, wherein (i) the first sub-picture comprises a first rectangular region of the picture and the second sub-picture comprises a second rectangular region of the picture, the second rectangular region being different from the first rectangular region, (ii) the first sub-picture and the second sub-picture each include at least one tile, and (iii) the first sub-picture and the second sub-picture do not share a common tile In an embodiment, the computer instructions, when executed by the at least one processor, further cause the at least one processor to decode the second sub-picture of the picture, independently from the first sub-picture, using the sub-picture and tile partitioning, and the at least one tile of the first sub-picture is a first plurality of tiles, and the at least one tile of the second sub-picture is a second plurality of tiles.

BRIEF DESCRIPTION OF THE DRAWINGS

Further features, the nature, and various advantages of the disclosed subject matter will be more apparent from the following detailed description and the accompanying drawings in which:

FIG. 4 is a schematic illustration of a simplified block diagram of a video encoder and a video source in accordance with an embodiment.

FIG. 6 is a schematic illustration of a system of an embodiment.

DETAILED DESCRIPTION

Figure 1:
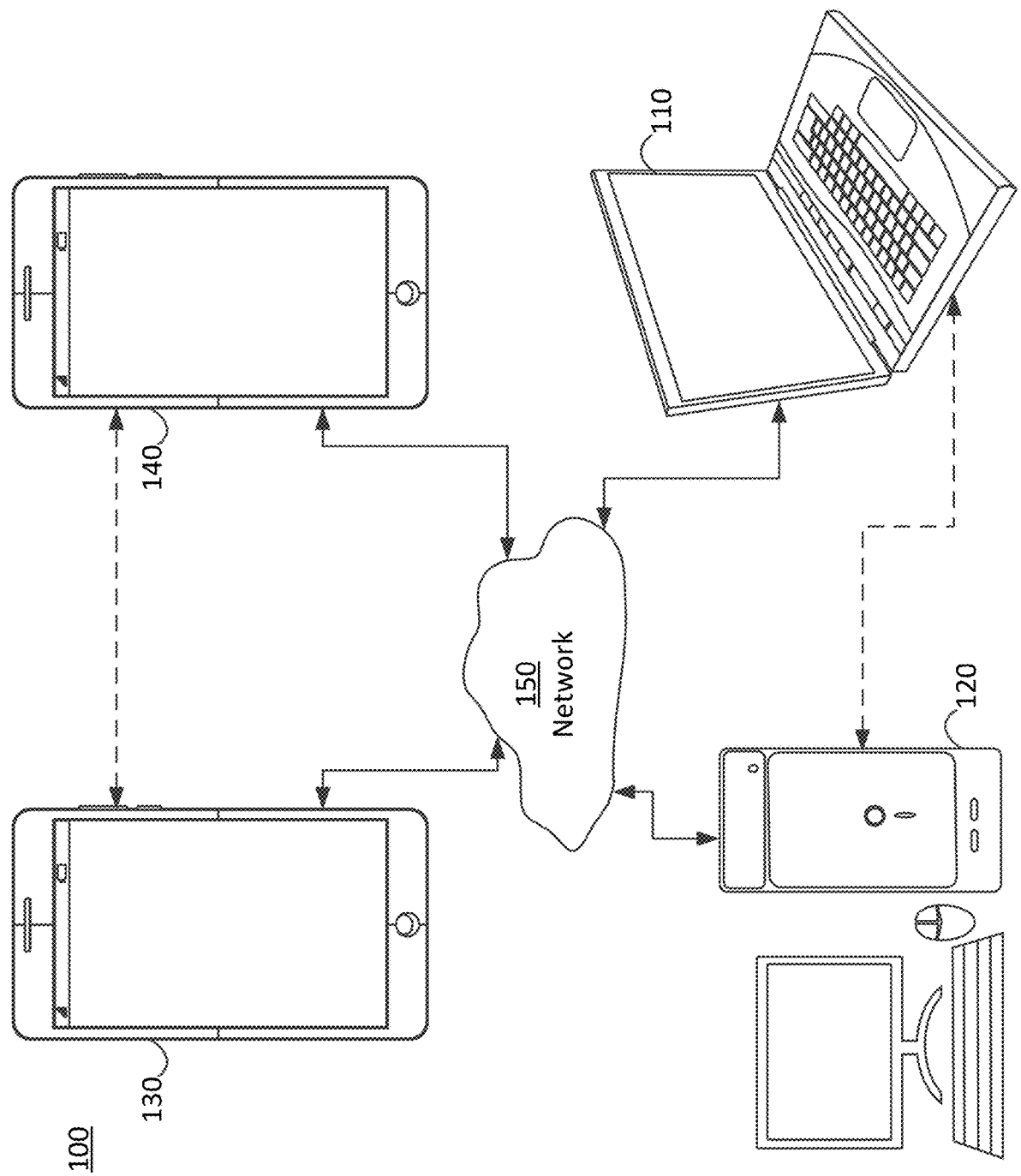
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
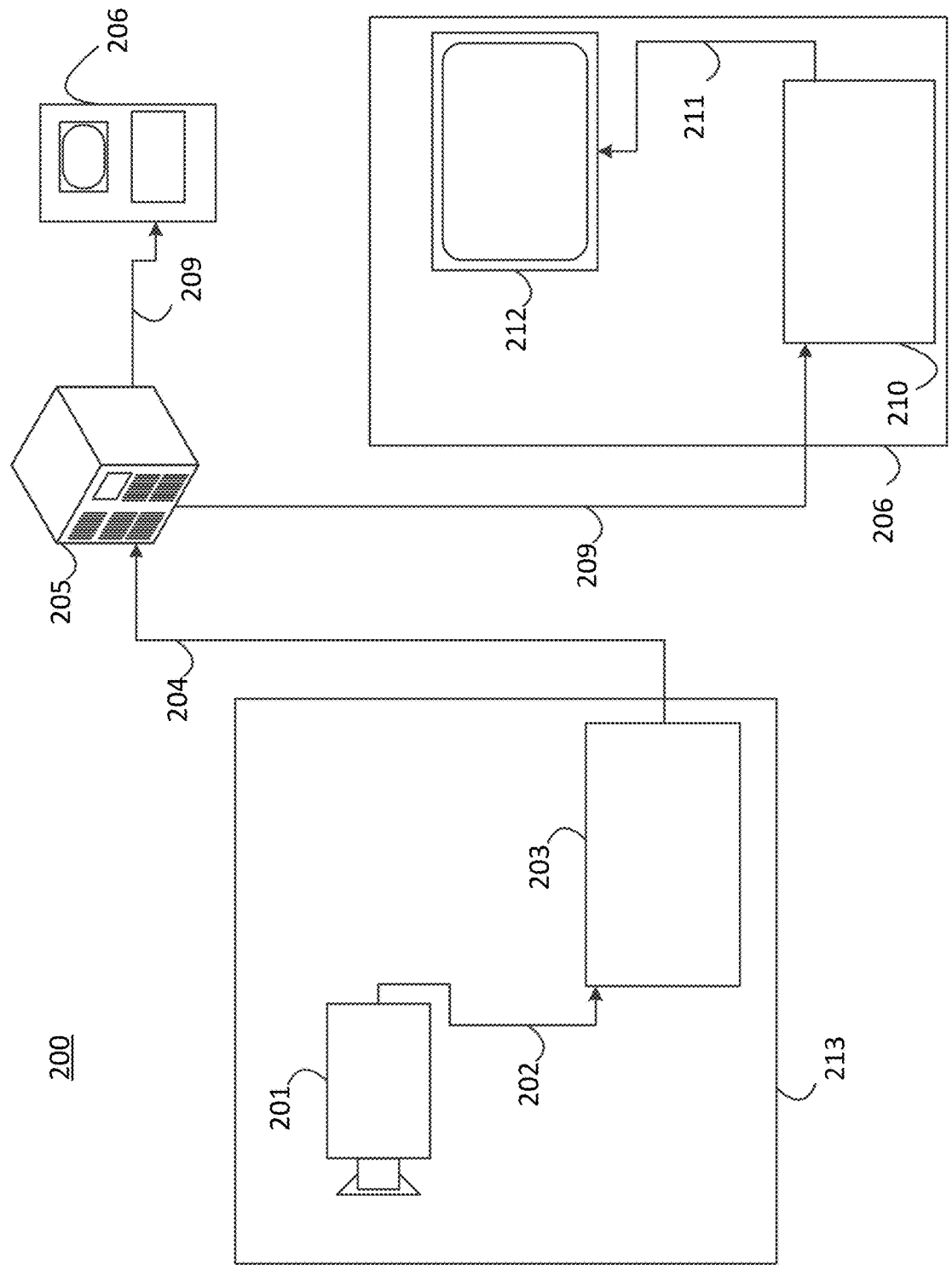
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem (213), that includes a video source 201 and an encoder 203. The streaming system 200 may further include at least one streaming server 205 and/or at least one streaming client 206.

The video source 201 can create, for example, an uncompressed video sample stream 202. The video source 201 may be, for example, a digital camera. The sample stream 202, depicted as a bold line to emphasize a high data volume when compared to encoded video bitstreams, can be processed by the encoder 203 coupled to the camera 201. The encoder 203 can include hardware, software, or a combination thereof to enable or implement aspects of the disclosed subject matter as described in more detail below. The encoder 203 may also generate an encoded video bitstream 204. The encoded video bitstream 204, depicted as a thin line to emphasize a lower data volume when compared to the uncompressed video sample stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
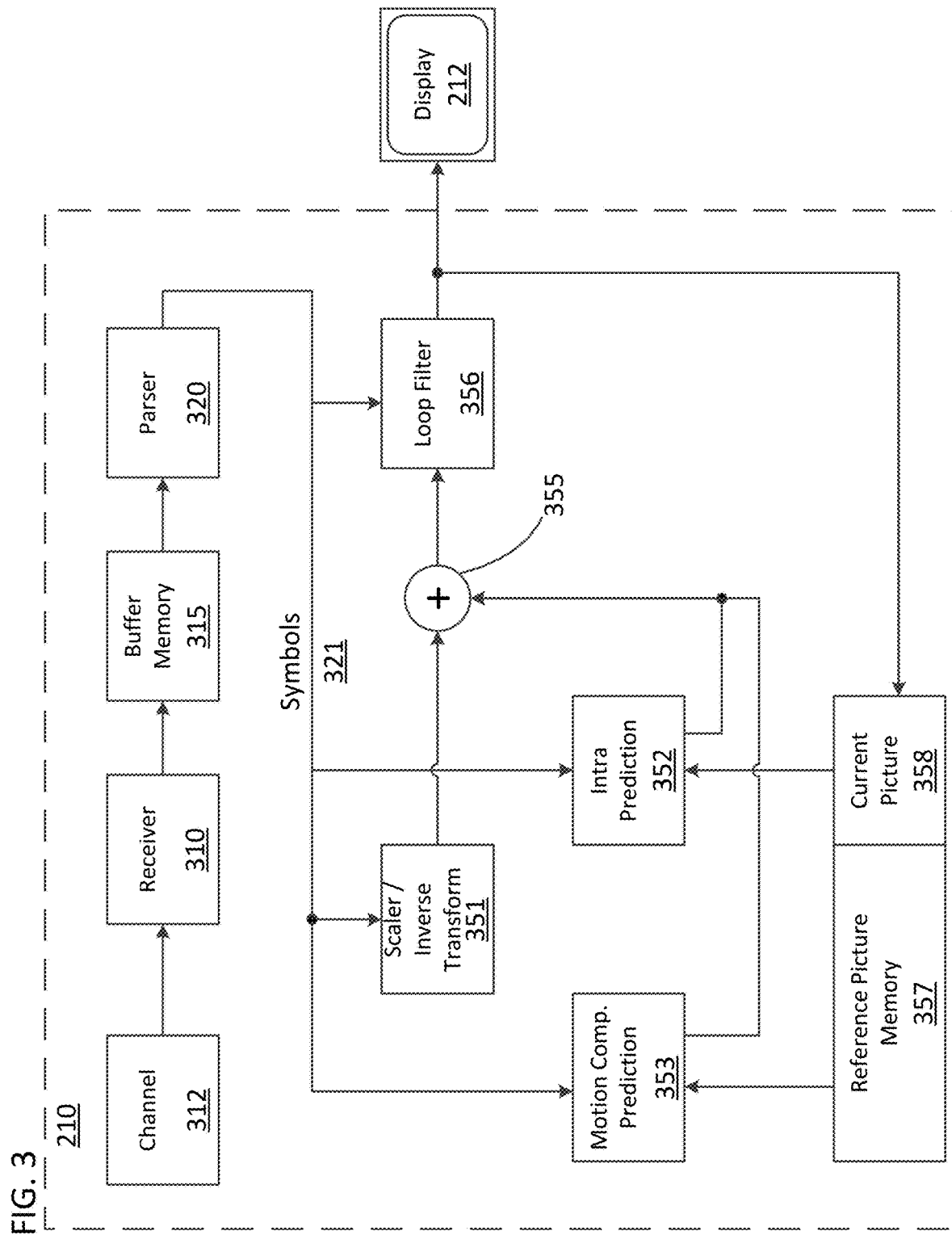
FIG. 3 is a schematic illustration of a simplified block diagram of a video decoder and a display in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra prediction unit 352, a Motion Compensation Prediction unit 353, an aggregator 355, a loop filter unit 356, reference picture memory 357, and current picture memory 358. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosychronous network, the buffer 315 may not be used, or can be small. For use on best effort packet networks such as the Internet, the buffer 315 may be required, can be comparatively large, and can be of adaptive size.

The video decoder 210 may include the parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI messages) or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units described below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks comprising sample values that can be input into the aggregator 355.

In some cases, the output samples of the scaler/inverse transform 351 can pertain to an intra coded block; that is: a block that is not using predictive information from previously reconstructed pictures, but can use predictive information from previously reconstructed parts of the current picture. Such predictive information can be provided by the intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access the reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from where the Motion Compensation Prediction unit 353 fetches prediction samples, can be controlled by motion vectors. The motion vectors may be available to the Motion Compensation Prediction unit 353 in the form of symbols 321 that can have, for example x, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture stored in the current picture memory 358 can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 434, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: x bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 203 may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder 203 may code and compress the pictures of the source video sequence into a coded video sequence 443 in real time or under any other time constraints as required by the application. Enforcing appropriate coding speed may be one function of the controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder (203) optimized for a certain system design.

Some video encoders operate in what a person skilled in the are readily recognizes as a "coding loop". As a simplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create, when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be substantially the same as of a "remote" decoder 210, which has already been described in detail above in conjunction with FIG. 3. However, as symbols are available and encoding/decoding of symbols to a coded video sequence by the entropy coder 445 and the parser 320 can be lossless, the entropy decoding parts of decoder 210, including channel 312, receiver 310, buffer 315, and parser 320 may not be fully implemented in the local decoder 433.

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously coded frames from the video sequence that were designated as "reference frames." In this manner, the coding engine 432 codes differences between pixel blocks of an input frame and pixel blocks of reference frame(s) that may be selected as prediction reference(s) to the input frame.

The local video decoder 433 may decode coded video data of frames that may be designated as reference frames, based on symbols created by the source coder 430. Operations of the coding engine 432 may advantageously be lossy processes. When the coded video data is decoded at a video decoder (not shown in FIG. 4), the reconstructed video sequence typically may be a replica of the source video sequence with some errors. The local video decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the video coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the video coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 203 may perform coding operations according to a predetermined video coding technology or standard, such as ITU-T Rec. H.265. In its operation, the video coder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The video coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The encoders and decoders of the present disclosure may encode and decode a video stream in accordance with tile and sub-picture partitioning design. Embodiments, including methods, using tile and sub-picture partitioning design may be used separately or combined in any order. Further, each of the methods, encoders, and decoders of the embodiments may be implemented by processing circuitry (e.g., one or more processors or one or more integrated circuits). In embodiments, one or more processors execute a program that is stored in a non-transitory computer-readable medium to perform encoding and decoding of a video stream in accordance with tile and sub-picture partitioning design of one or more embodiments. Some aspects of the tile and sub-picture partitioning design of the present disclosure are described below.

It is useful to Versatile Video Coding (VVC), and some other video compression standards, to include motion constrained tile set (MCTS)-like functionality with the following features: (1) A sub-bitstream including a video coding layer (VCL) network abstraction layer (NAL) and non-VCL NAL units, which are needed to decode a subset of tiles, that can be extracted from one VVC bitstream covering all tiles composing the entire picture; and (2) the extracted sub-bitstream being independently decodable in a VVC decoder, without referencing NAL units.

Such a partitioning mechanism with the above features may be called an MCTS (motion constrained tile set) or a sub-picture. In order to avoid confusion between the terms "tile group" and "tile set", the term "sub-picture" is used in this disclosure to describe the above partitioning mechanism.

Figure 5A:
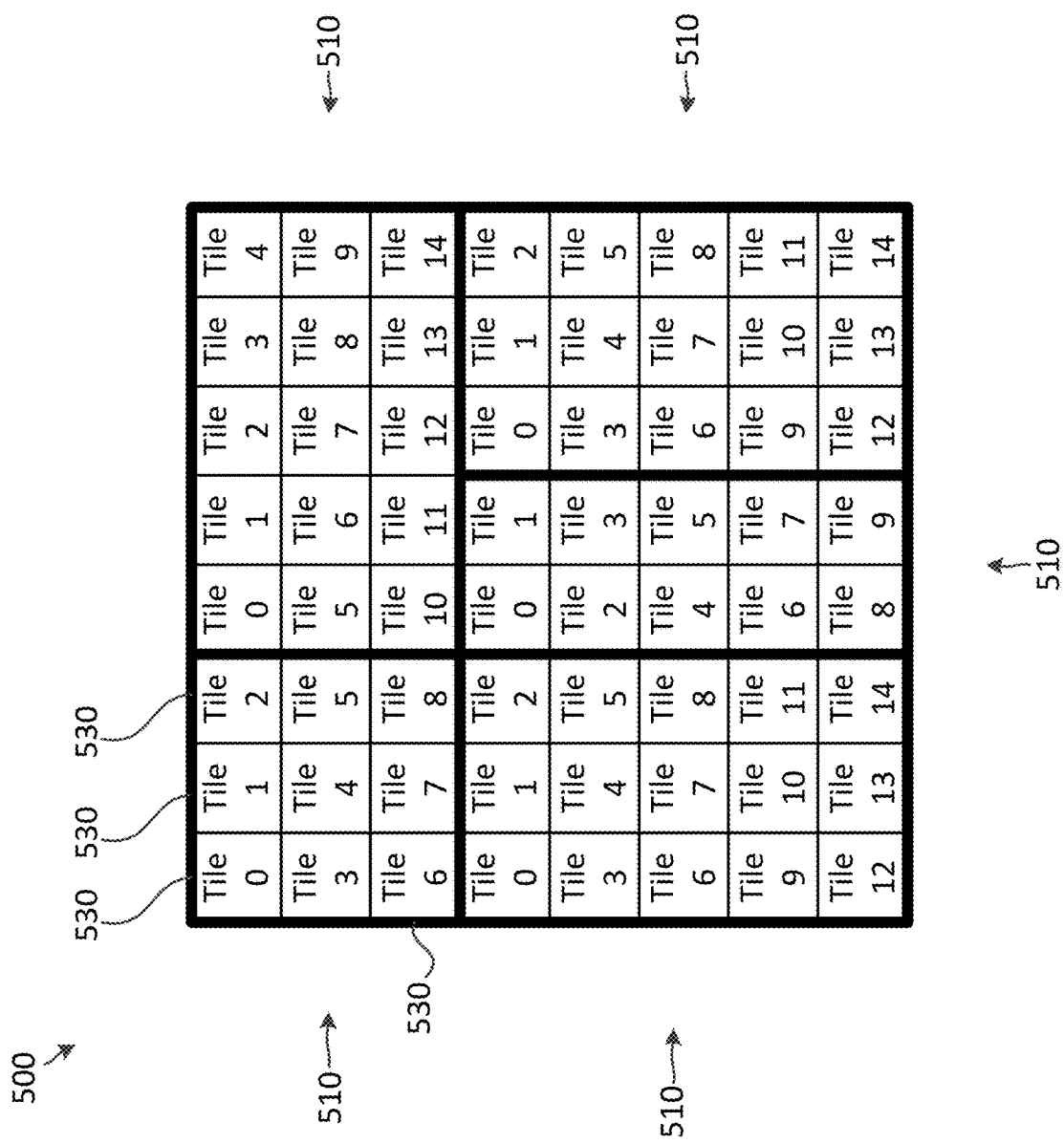
FIG. 5A is a diagram of a picture of an embodiment, illustrating sub-pictures and tiles.
Figure 5B:
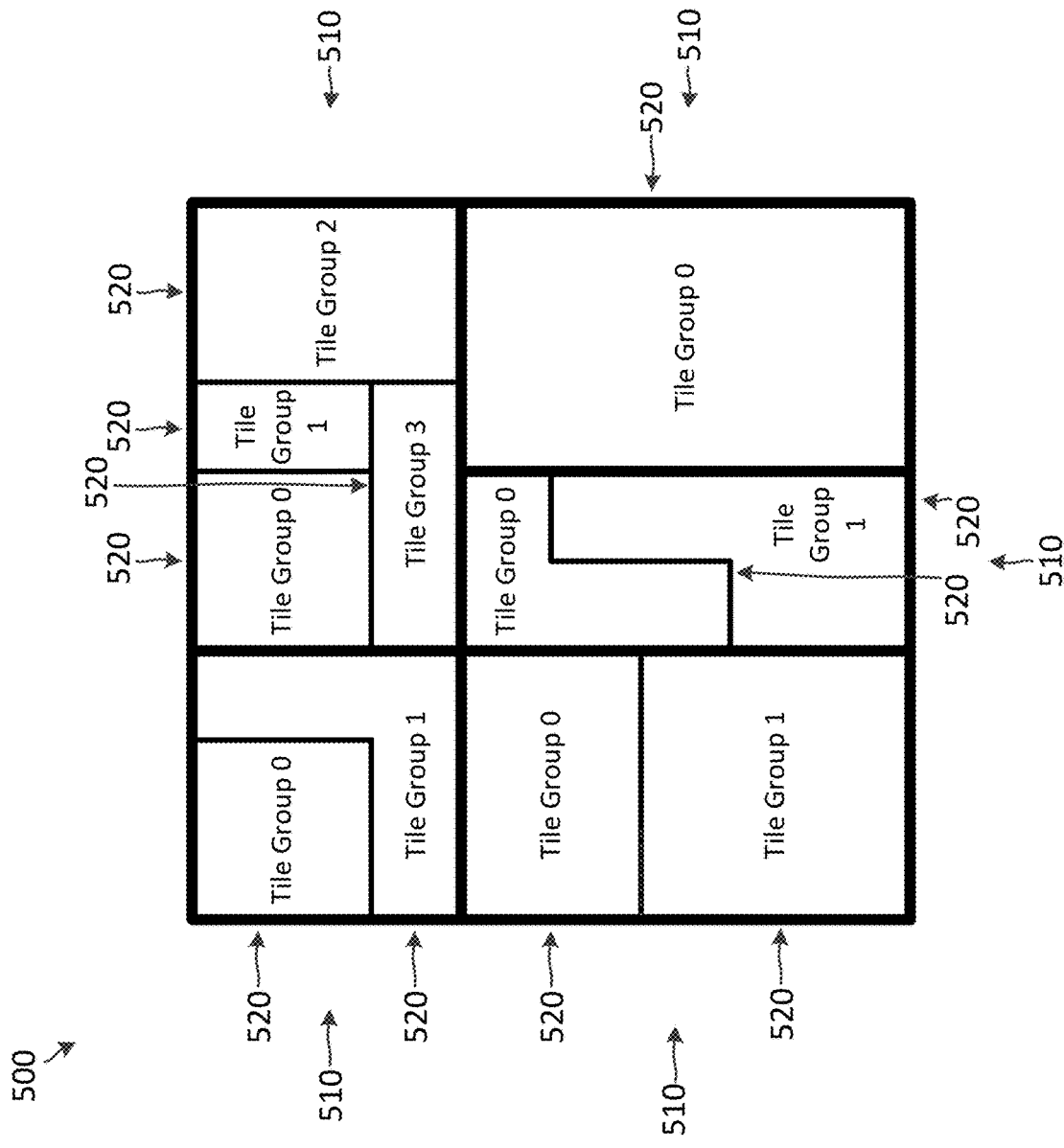
FIG. 5B is a diagram of the picture of the embodiment, illustrating sub-pictures and tile groups.
Figure 5C:
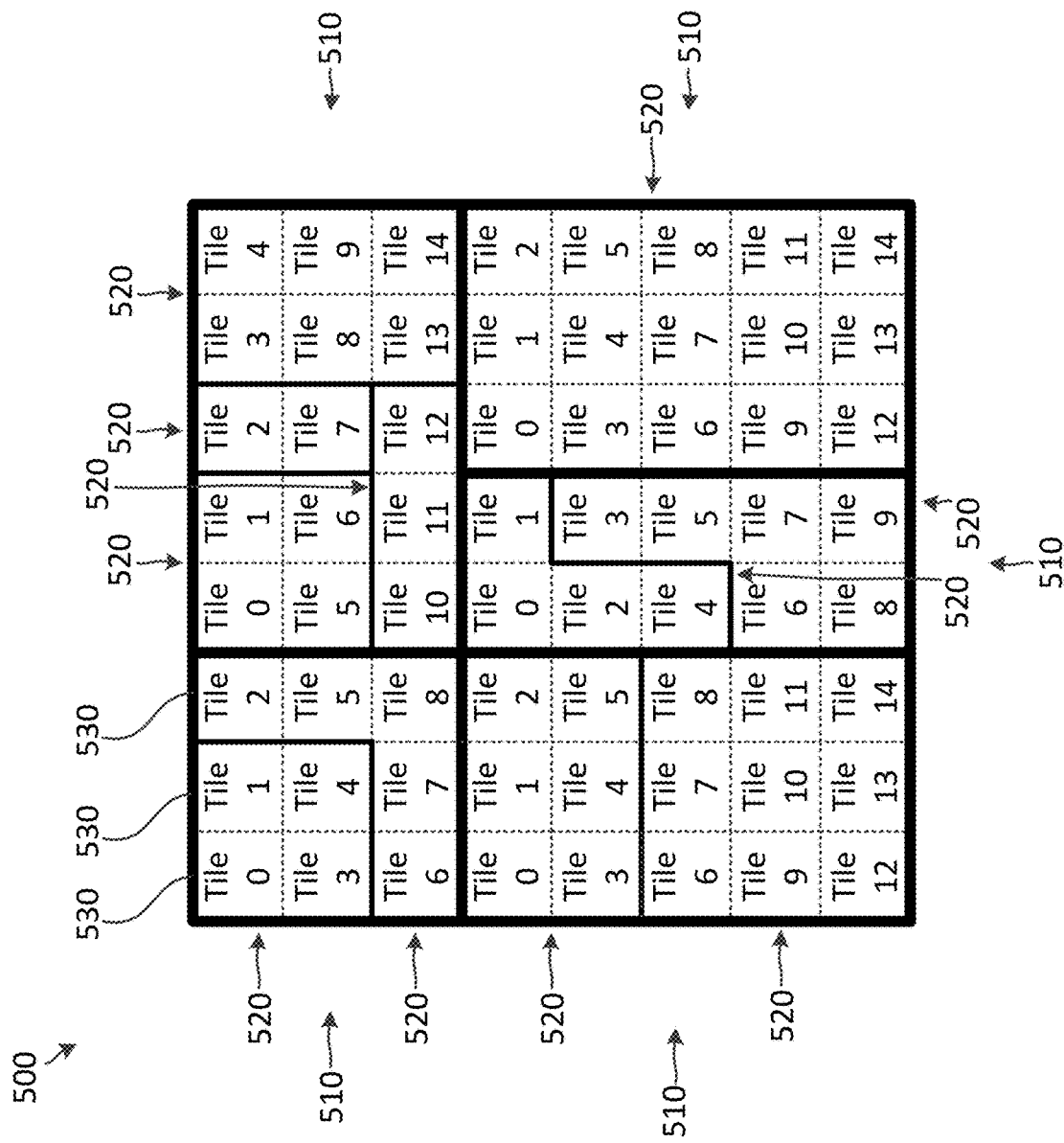
FIG. 5C is a diagram of the picture of the embodiment, illustrating sub-pictures, tile groups, and tiles.

A non-limiting example structure of the tile and sub-picture partitioning design of an embodiment is described below with reference to FIGS. 5A-C. In an embodiment, a video stream includes a plurality of pictures 500. Each picture 500 may include one or more sub-pictures 510, wherein each sub-picture 510 includes one or more tiles 530 as, for example, illustrated in FIGS. 5A-B. The size and shape of the sub-pictures 510 and tiles 530 are not limited by FIGS. 5A-B, and can be any shape or size. The tiles 510 of each sub-picture 510 may be divided into one or more tile groups 520 as, for example, illustrated in FIGS. 5B-C. The size and shape of the tile groups 520 are not limited by FIGS. 5B-C, and can be any shape or size. In an embodiment, one or more tiles 530 may not be provided in any tile group 520. In an embodiment, tile groups 520 within a same sub-picture 510 may share one or more tiles 530. Embodiments of the present disclosure may decode and encode a video stream in accordance with a tile and sub-picture partitioning design, wherein sub-pictures 510, tile groups 520, and tiles 530 are defined and used.

Embodiment of sub-picture design of the present disclosure may include aspects of sub-picture design from WET-M0261.

In addition, the following features of embodiments of sub-picture design of the present disclosure reinforces the usefulness of sub-picture design of the present disclosure for immersive media use cases:

(1) Each sub-picture 510 may have a different random access period and a different inter-prediction structure. Such a feature may be used to have an unequal random access period for view-port dependent 360 streaming. In view-port dependent 360 streaming, only centralized regions with dynamic contents may receive attention from viewers, while other background regions may change slowly. Having different GOP structures and different random access periods can help to provide fast access of specific regions with overall better visual quality.

(2) Sub-picture 510 may have different resampling ratios from each other. With such feature, quality of background regions (e.g. top and bottom in 360, non-dynamic object in PCC) can be efficiently scarified for overall bit-efficiency.

(3) Multiple sub-pictures 510 composing a picture 500 may or may not be encoded by a single encoder and decoded by a single decoder. For example, a sub-picture 510 can be independently encoded by an encoder, while another sub-picture 510 is encoded by another encoder. Then, sub-bitstreams corresponding to those sub-pictures 510 can be merged into a bitstream, which can be decoded by a decoder. Such a feature may be used with, for example, E-sport content. For example, in an embodiment, there may be a number of players (Player 1 to Player N) participating in a game (e.g. a video game), and the game and camera views of each of these players may be captured and delivered. Based on the selected players of each viewer, a media processor can group related game views (e.g., of following players), and convert the group to a video.

In the embodiment, there may be cameras that capture images of respective players that are playing the game. For example, as illustrated in FIG. 6, the embodiment may include a camera of cameras 610 that captures a video image 611 of Player 1, a camera of cameras 610 that captures a video image 612 of Player 2, and so forth. Additionally, one or more processors with memory may capture video images, including observer views 620 and player views 630. The observer views 620 may each be, for example, a spectator view of the game in which the players of the game may not be able to view while actively playing the game. For example, the spectator views may be from a perspective of a video game world that is distinct from the viewpoints viewed by the players and/or may include information to assist a spectator in watching the game, the information not being viewable by the players while they are actively playing. The observer views 620 may include one or more observer views, including a first observer view 621. The player views 630 may each be a view seen by a respective player that is playing the game. For example, a first player view 631 may be the video game images viewed by Player 1 while playing the game, a second player view 632 may be the video game images viewed by Player 2 while playing the game, and so forth.

The video images from the cameras 610, the observer views 620, and the player views 630 may be received by a compositor 640. In embodiments, any number of such video images may be separately encoded by a respective encoder and/or one or more of the video images may be encoded together with a single encoder. The compositor 640 may receive the video images after the video images are encoded by one or more encoders, before the video images are encoded, or after the video images are decoded. The compositor 640 may also function as an encoder and/or a decoder. Based on an input, such as a layout & stream selection 660, the compositor 640 may provide a specific composite of two or more of the video images from the cameras 610, the observer views 620, and the player views 630 to a transcoder 650 as a composite video 690 illustrated in FIG. 7. The transcoder 650 may transcode the composite video 690 and output the composite video 690 to a media sink 680 which may include one or more displays that display the composite video 690. The transcoder 650 may be monitored by a network monitor 670.

Figure 7:
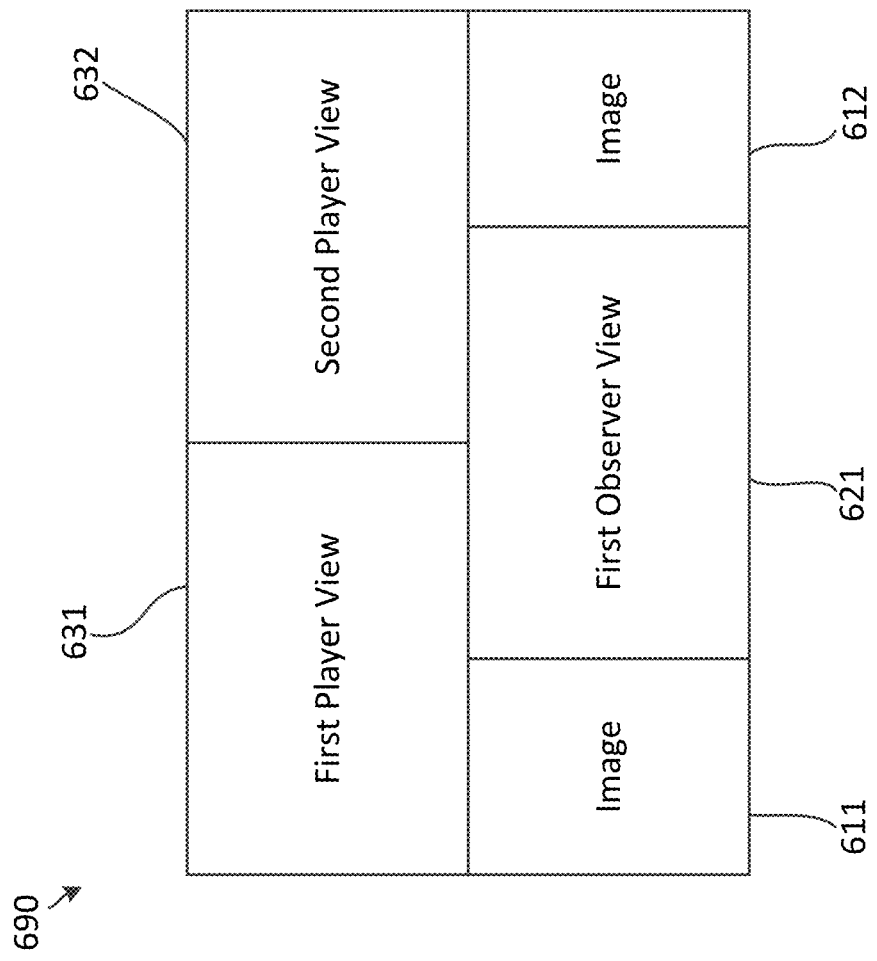
FIG. 7 is a schematic illustration of a composite video of an embodiment.

As illustrated in FIG. 7, the composite video 690 that is transcoded may include, for example, a composite of the video image 611 of player 1, the video image 612 of player 2, the first player view 631, the second player view 632, and the first observer view 621. However, any combination of any number of any of the video images provided to the compositor 640 may be composited together as the composite video 690.

In an embodiment, the sub-picture design includes the following features and technical details: (1) A sub-picture 510 is a rectangular region. (2) A sub-picture 510 may or may not be partitioned into multiple tiles 530. (3) If partitioned to multiple tiles 530, each sub-picture 510 has its own tile scan order. (4) Tiles 530 in a sub-picture 510 can be combined into a rectangular or non-rectangular tile group 520, but tiles 530 belonging to different sub-pictures 510 cannot be grouped together.

At least the following (1)-(7) aspects of the sub-picture design of embodiments of the present disclosure are distinguished from JVET-M0261.

(1) In an embodiment, each sub-picture 510 may reference its own SPS, PPS and APS, but each SPS may contain all sub-picture partitioning information.

(a) In an embodiment, the sub-picture partitioning and lay-out (informative) information may be signaled in SPS. For example, the decoded sub-picture and the output size of the sub-picture 510 may be signaled. For example, the reference picture list (RPL) information of the sub-picture 510 may be signaled. In an embodiment, each sub-picture 510 may or may not have the same RPL information in the same picture. (b) In an embodiment, the tile partitioning information of the sub-picture 510 may be signaled in PPS. (c) In an embodiment, the ALF coefficients of the sub-picture 510 may be signaled in APS. (d) In an embodiment, any parameter set or SEI message can be referenced by multiple sub-pictures 510.

(2) In an embodiment, a sub-picture ID may be signaled in an NAL unit header.

(3) In an embodiment, any decoding process (e.g. in-loop filtering, motion compensation) across sub-picture boundaries may be disallowed.

(4) In an embodiment, the boundary of a sub-picture 510 may be extended and padded for motion compensation. In an embodiment, a flag indicating whether the boundary is extended or not may be signalled in SPS.

(5) In an embodiment, the decoded sub-picture 510 may or may not be resampled for output. In an embodiment, the spatial ratio between the decoded sub-picture size and the output sub-picture size signalled in SPS may be used to calculate the resampling ratio.

(6) In an embodiment, with respect to extracting sub-bitstream, the VCL NAL units corresponding to the sub-picture ID is extracted, and others are removed. The parameter sets referred by VCL NAL units with the sub-picture ID is extracted, and others are removed.

(7) In an embodiment, with respect to assembling sub-bitstreams, all VCL NAL units having the same POC value may be interleaved with the same access unit (AU). The partitioning information of sub-pictures 510 in SPS is rewritten if necessary. The sub-picture ID and any parameter set IDs are rewritten if necessary.

A sequence parameter set RBSP syntax of an embodiment of the present disclosure is provided in Table 1 below.

TABLE 1

|  | Descriptor |
|---|---|
| seq_parameter_set_rbsp( ) { |  |
| ... |  |
|    pic_width_in_luma_samples | ue(v) |
|    pic_height_in_luma_samples | ue(v) |
|    num_sub_pictures_in_pic | ue(v) |
|    if(num_sub_pictures > 0) |  |
|      sub_pic_id_length_minus1 |  |
|    for( i = 0; i < num_sub_pictures; i++) { |  |
|      dec_sub_pic_width_in_luma_samples[ i ] | ue(v) |
|      dec_sub_pic_height_in_luma_samples[ i ] | ue(v) |
|      out_sub_pic_width_in_luma_samples[ i ] | ue(v) |
|      out_sub_pic_height_in_luma_samples[ i ] | ue(v) |
|      if( i > 0 ) { |  |
|         sub_pic_id[ i ] | u(v) |
|         left_top_pos_x_in_luma_samples[ i ] | ue(v) |

TABLE 1-continued

|  | Descriptor |
|---|---|
|         left_top_pos_y_in_luma_samples[ i ] | ue(v) |
|      } |  |
|    } |  |
| ... |  |
| } |  |

"num_sub_pictures_in_pic" specifies the number of sub-pictures 510 in each picture 500 referring to the SPS.

"signalled_sub_pic_id_length_minus1" equal to 1 specifies the number of bits used to represent the syntax element "sub_pic_id[i]" when present, and the syntax element "tile_group_sub_pic_id[i]" in tile group headers. The value of "signalled_sub_pic_id_length_minus1" may be in the range of 0 to 15, inclusive.

"dec_sub_pic_width_in_luma_samples[i]" specifies the width of the i-th decoded sub-picture 510 in units of luma samples in the coded video sequence. "dec_sub_pic_width_in_luma_samples[i]" may not be equal to 0 and may be an integer multiple of "MinCbSizeY".

"dec_sub_pic_height_in_luma_samples[i]" specifies the height of the i-th decoded sub-picture 510 in units of luma samples in the coded video sequence. "dec_sub_pic_height_in_luma_samples[i]" may not be equal to 0 and may be an integer multiple of "MinCbSizeY".

"output_sub_pic_width_in_luma_samples[i]" specifies the width of the i-th output sub-picture 510 in units of luma samples. "output_sub_pic_width_in_luma_samples" may not be equal to 0.

"output_sub_pic_height_in_luma_samples[i]" specifies the height of the i-th output sub-picture 510 in units of luma samples. "output_sub_pic_height_in_luma_samples" may not be equal to 0.

"sub_pic_id[i]" specifies the sub-picture identifier of the i-th sub-picture 510. The length of the "sub_pic_id[i]" syntax element is "sub_pic_id_length_minus1"+1 bits. When not present, the value of "sub_pic_id[i]" is set equal to 0.

"left_top_pos_x_in_luma_samples[i]" specifies the column position of the first pixel of the i-th sub-picture 510.

"left_top_pos_y_in_luma_samples[i]" specifies the row position of the first pixel of the i-th sub-picture 510.

In an embodiment, each sub-picture 510 is resampled to its corresponding output sub-picture size after decoding. In an embodiment, a sub-picture 510 cannot be overlapped with a region of another sub-picture 510A. In an embodiment, the width and the height of the picture size composed by all sub-picture output sizes and positions may be equal to "pic_width_in_luma_samples" and "pic_height_in_luma_samples", but a partial picture region composed by a sub-set of sub-pictures can be decoded.

A tile group header syntax of an embodiment of the present disclosure is provided in Table 2 below.

TABLE 2

|  | Descriptor |
|---|---|
| tile_group_header( ) { |  |
|    tile_group_pic_parameter_set_id | ue(v) |
|    if(num_sub_pictures > 0) |  |
|      tile_group_sub_pic_id | u(v) |
|    if( rect_tile_group_flag || NumTilesInPic > 1 ) |  |
|      tile_group_address | u(v) |

TABLE 2-continued

| | Descriptor |
|---|---|
| if( !rect_tile_group_flag && !single_tile_per_tile_group_flag ) num_tiles_in_tile_group_minus1 | ue(v) |

"tile_group_sub_pic_id" specifies the sub-picture identifier of the sub-picture which the current tile group belongs to.

Tiles in HEVC were designed to support the following two main use cases: (1) parallel decoding process, and (2) partial delivery and decoding. The first use case was basically enabled by using the original tile in HEVC, but it still had some dependency for inter-prediction operations. The second use case was enabled by employing additional SEI messages, called motion constrained tile set (MCTS), even though this was an optional way. In VVC, the same tile design was inherited from HEVC, but a new scheme, so-called tile groups, was adopted to support multiple use cases.

The present disclosure provides embodiments that include sub-picture design that may be used for view-port based delivery of VR360 or other immersive contents supporting ⅗ degree-of-freedoms. Such a functionality would be useful in VVC to be widely used for future immersive content services. It is also desirable to have the full capability to enable complete parallel decoding without any dependency across tile boundaries.

Two syntax elements ("loop_filter_across_tiles_enabled_flag" and "loop_filter_across_tile_groups_enabled_flag") may be used to provide better parallel processing capability. These syntax elements indicate in-loop filtering operations are not performed across tile boundaries or tile group boundaries, respectively. In an embodiment of the present disclosure, the above two syntax elements may be included alongside two additional syntax elements. The two additional syntax elements may indicate inter-prediction operations are performed or not performed across tile or tile group boundaries, respectively. In these semantics, the inter-prediction operations include, for example, temporal motion compensation, current picture reference, temporal motion vector prediction, and any parameter prediction operations between pictures. Hence, in an embodiment of the present disclosure, motion-constrained tiles, as opposed to motion-constrained tile sets, may be used in coding/decoding standards such as HEVC. This feature can be mutually compatible with a sub-picture or MCTS scheme.

The above syntax elements are useful for at least two use cases: (1) full parallel decoding process without any dependency across tile/tile group boundaries, and (2) reconfiguring the tile-group lay out without transcoding VCL NAL units.

With respect to the first use case, even if a picture 500 is partitioned into two tile groups 520 and delivered, multiple decoders can decode a tile group 520 in parallel when the tile group 520 includes multiple tiles 530. Then, the full parallel processing capability will be helpful.

The second use case is related to a use case of VR360 view-port dependent processing. When a targeted view-port is shifted to a boundary between two tile groups, a decoder may be required to receive and decode two tile groups to display the targeted view-port. However, in an embodiment of the present disclosure with the syntax elements described, the partitioning information of tile groups 520 in PPS can be updated by, for example, a server or a cloud processor, to cause only one tile group 520 to include the entire targeted view-port and the one tile group 520 can be delivered to the decoder. This instant repartitioning is possible without VLC-level modifications, when all tiles are encoded as motion-constrained tiles.

Examples of syntax elements of an embodiment of the present disclosure is provided below.

A picture parameter set RBSP syntax of an embodiment of the present disclosure is provided in Table 3 below.

TABLE 3

| | Descriptor |
|---|---|
| pic_parameter_set_rbsp( ) { | |
| ... | |
| full_parallel_decoding_tile_enabled_flag | u(1) |
| if(!full_parallel_decoding_enabled_flag) { | |
|     loop_filter_across_tiles_enabled_flag | u(1) |
|     if( loop_filter_across_tiles_enabled_flag ) | |
|         loop_filter_across_tile_groups_enabled_flag | u(1) |
|     inter_prediction_across_tiles_enabled_flag | u(1) |
|     if(inter_prediction_across_tiles_enabled_flag ) | |
|         inter_prediction_across_tile_groups_enabled_flag | u(1) |
| } | |
| ... | |
| } | |

"full_parallel_decoding_enabled_flag" equal to 1 specifies any processing and prediction across tile boundary is disallowed.

"loop_filter_across_tiles_enabled_flag" equal to 1 specifies that in-loop filtering operations is performed across tile boundaries in pictures referring to the PPS. "loop_filter_across_tiles_enabled_flag" equal to 0 specifies that in-loop filtering operations are not performed across tile boundaries in pictures referring to the PPS. The in-loop filtering operations include, for example, the deblocking filter, sample adaptive offset filter, and adaptive loop filter operations. When not present, the value of loop_filter_across_tiles_enabled_flag may be inferred to be equal to 0.

"loop_filter_across_tile_groups_enabled_flag" equal to 1 specifies that in-loop filtering operations is performed across tile group boundaries in pictures referring to the PPS. "loop filter across tile group enabled flag" equal to 0 specifies that in-loop filtering operations are not performed across tile group boundaries in pictures referring to the PPS. The in-loop filtering operations include, for example, the deblocking filter, sample adaptive offset filter, and adaptive loop filter operations. When not present, the value of "loop_filter_across_tile_groups_enabled_flag" may be inferred to be equal to 0.

"inter_prediction_across_tiles_enabled_flag" equal to 1 specifies that inter-prediction operations is performed across tile boundaries in pictures referring to the PPS. "inter_prediction_across_tiles_enabled_flag" equal to 0 specifies that inter-prediction operations are not performed across tile boundaries in pictures referring to the PPS. The inter-prediction operations include, for example, the temporal motion compensation, current picture reference, temporal motion vector prediction, and any parameter prediction operations between pictures. When not present, the value of "inter_prediction_across_tiles_enabled_flag" may be inferred to be equal to 0.

"inter_prediction_across_tile_groups_enabled_flag" equal to 1 specifies that inter-prediction operations is performed across tile group boundaries in pictures referring to the PPS. "inter_prediction_across_tile_groups_enabled_flag" equal to 0 specifies that inter-prediction operations are not performed across tile group boundaries in pictures referring to the PPS. The inter-prediction operations include, for example, the temporal motion compensation, current picture reference, temporal motion vector prediction, and any parameter prediction operations between pictures. When not present, the value of "inter_prediction_across_tile_groups_enabled_flag" may be inferred to be equal to 0.

In VVC, tile design is similar to that in HEVC, but a new scheme, also referred to as "tile group," was adopted to support multiple embodiments, including but not limited to: (1) partial delivery and decoding, (2) parallel decoding process, and (3) MTU size matching with tile granularity.

Figure 8:
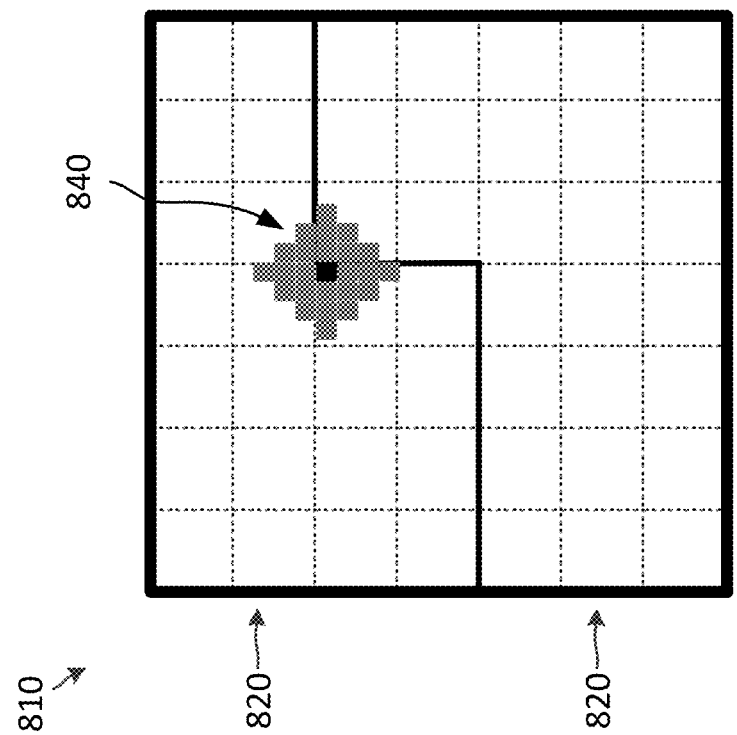
FIG. 8 is a schematic illustration of an adaptive loop filter processing across tile boundaries of tile groups.

For parallel processing, two syntax elements ("loop_filter_across_tiles_enabled_flag" and "loop_filter_across_tile_groups_enabled_flag") may be used to selectively allow in-loop filtering process across tile group boundary. However, with such syntax elements, disabling in-loop filtering across tile group boundaries while enabling the filtering across tile boundaries may complicate the filtering process, when the tile group is non-rectangular. As illustrated in FIG. 8, an adaptive loop filter (ALF) is processed with a 7×7 diamond filter 840 across a tile group boundary between two tile groups 820. If the tile groups 820 are non-rectangular, its filtering process is chaotic. For each pixel, each filter coefficient, a boundary checking process is mandatory to identify which pixels belong to the current tile group. The cases of temporal motion compensation and current picture reference are not different. If a boundary extension is applied at a tile group boundary for motion compensation, its padding process is also complex.

According to an embodiment of the present disclosure, tile-group-level loop filtering (or any other operation) control at boundaries of tile groups shall be allowed only for rectangular tile groups. Thus, chaos in a filtering process and padding process can better be avoided.

Moreover, the flag "loop_filter_across_tile_groups_enabled_flag" may not need to be signaled when single_tile_per_tile_group_flag is equal to 1. Thus, an embodiment of the present dislcosure may include, for example, the following picture parameter set RBSP syntax as shown in Table 4.

TABLE 4

| | Descriptor |
| --- | --- |
| pic_parameter_set_rbsp( ) { | |
| ... | |
| loop_filter_across_tiles_enabled_flag | u(1) |
| if( loop_filter_across_tiles_enabled_flag && rec_tile_group_flag | |

TABLE 4-continued

| | Descriptor |
| --- | --- |
| && !single_tile_per_tile_group_flag) | |
| loop_filter_across_tile_groups_enabled_flag | u(1) |
| } | |

"loop_filter_across_tile_groups_enabled_flag" equal to 1 specifies that in-loop filtering operations is performed across tile group boundaries in pictures referring to the PPS. "loop_filter_across_tile_group_enabled_flag" equal to 0 specifies that in-loop filtering operations are not performed across tile group boundaries in pictures referring to the PPS. The in-loop filtering operations include, for example, the deblocking filter, sample adaptive offset filter, and adaptive loop filter operations. When not present, the value of "loop_filter_across_tile_groups_enabled_flag" may be inferred to be equal to the value of loop_filter_across_tiles_enabled_flag.

In an embodiment, a method may be performed by at least one processor to decode a sub-bitstream of a coded video stream. The coded video stream may include a coded version of a plurality of sub-pictures 510 for one or more pictures 500.

Figure 9:
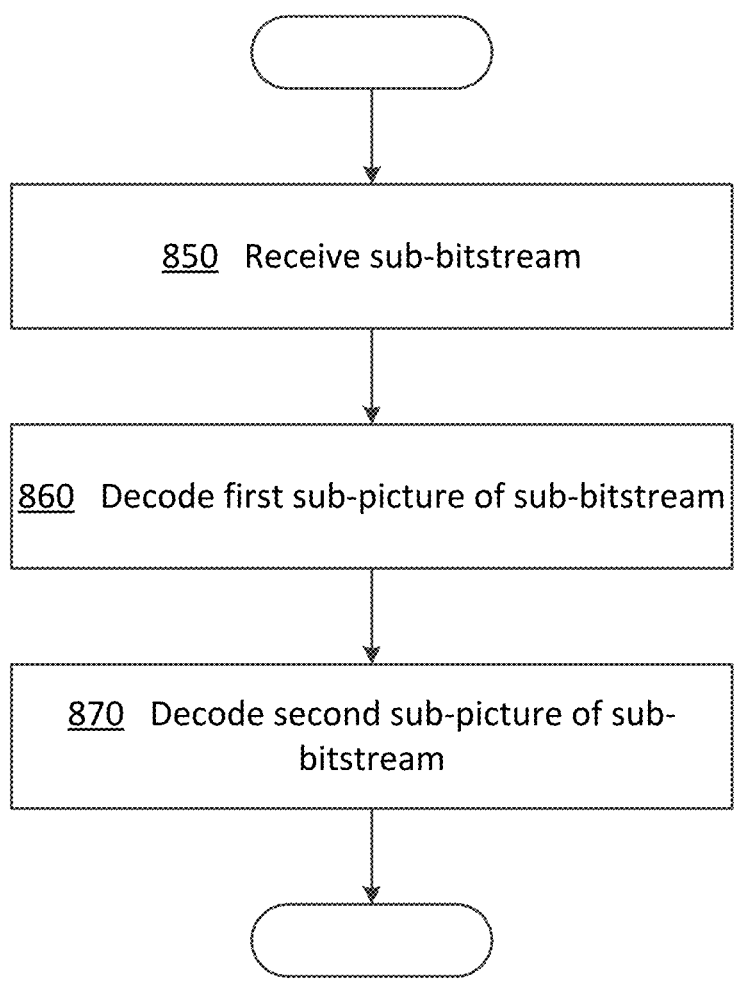
FIG. 9 is diagram illustrating a method of an embodiment.

As illustrated in FIG. 9, the method may include the at least one processor receiving the sub-bitstream (850). In an embodiment, the sub-bitstream may include the information for one or more of the sub-pictures 510 of one or more of the pictures 500, and may not include information for other sub-pictures 510 of the one or more of the pictures 500. After receiving the sub-bitstream, the at least one processor may decode sub-pictures 510 included in the sub-bitstream. For example, assuming the sub-bitstream includes the information for a first sub-picture and a second sub-picture of a single picture, the at least one processor may decode the first sub-picture of the picture, independently from the second sub-picture, in accordance with a decoding technology using tile and sub-picture partitioning design of the present disclosure (860). The decoding of the first sub-picture may include decoding tiles of the first sub-picture. The at least one processer may also decode the second sub-picture of the picture, in accordance with the decoding technology using tile and sub-picture partitioning design of the present disclosure (870). The decoding of the second sub-picture may include decoding tiles of the second sub-picture.

In embodiments, at least one processor may encode sub-pictures 510 of one or more pictures 500 in accordance with tile and sub-picture partitioning design of the present disclosure and send one or more sub-bitstreams of a video bitstream, that includes one or more encoded sub-pictures 510, to one or more decoders for decoding in accordance with the tile and sub-picture partitioning design of the present disclosure.

In embodiments, decoders of the present disclosure (e.g. video decoder 210) may perform the decoding methods of the present disclosure by accessing computer program code stored in memory and operating as instructed by the computer program code. For example, in an embodiment, the computer program code may include decoding code configured to cause a decoder to decode the first sub-picture of the picture, independently from the second sub-picture, in accordance with a decoding technology using tile and sub-picture partitioning design of the present disclosure, and further cause the decoder to decode the second sub-picture of the picture, independently from the first sub-picture, in accordance with the decoding technology using tile and sub-picture partitioning design of the present disclosure.

In embodiments, encoders of the present disclosure (e.g. encoder 203) may perform the encoding methods of the present disclosure by accessing computer program code stored in memory and operating as instructed by the computer program code. For example, in an embodiment, the computer program code may include encoding code configured to cause an encoder to encode sub-pictures 510 of one or more pictures 500 in accordance with tile and sub-picture partitioning design of the present disclosure. The computer program code may also include sending code configured to cause the sending of one or more sub-bitstreams of a video bitstream, that includes one or more encoded sub-pictures 510, to one or more decoders for decoding in accordance with the tile and sub-picture partitioning design of the present disclosure The techniques, described above, can be implemented as computer software using computer-readable instructions and physically stored in one or more computer-readable media. For example, FIG. 10 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
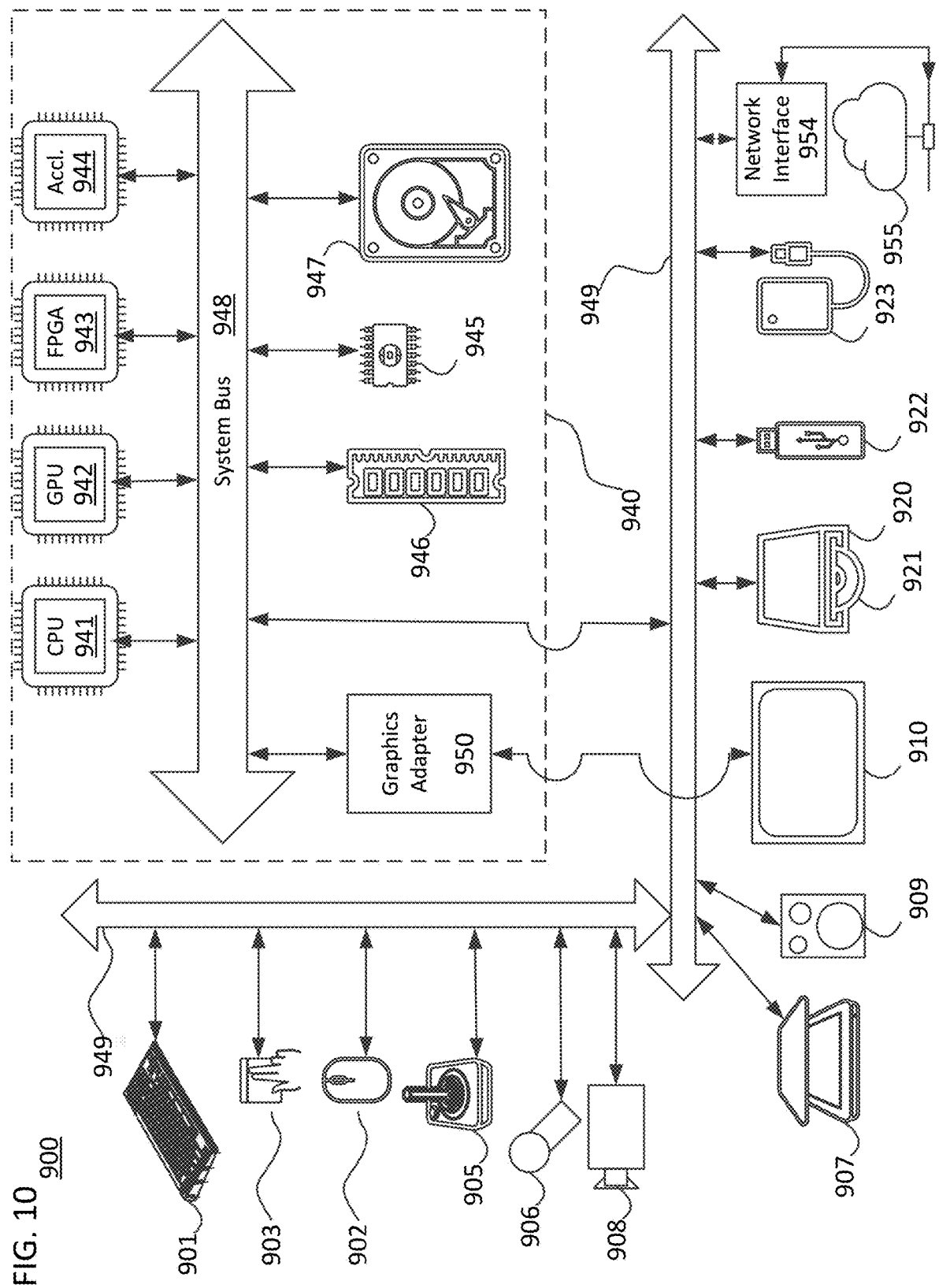
FIG. 10 is a diagram of a computer system suitable for implementing embodiments.

The components shown in FIG. 10 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method performed by at least one processor to decode a sub-bitstream of a coded video stream, the coded video stream including a coded version of a first sub-picture and a second sub-picture of a picture, the method comprising:

receiving the sub-bitstream; and
decoding the first sub-picture of the picture, independently from the second sub-picture, using sub-picture, tile group, and tile partitioning, wherein
(i) the first sub-picture is a first rectangular region of the picture and the second sub-picture is a second rectangular region of the picture, the second rectangular region being different from the first rectangular region,
(ii) the first sub-picture includes a first plurality of tiles, and the second sub-picture includes at least one tile,
(iii) the first sub-picture and the second sub-picture do not share a common tile,
(iv) the first plurality of tiles of the first sub-picture are grouped into at least two first tile groups, and
(v) the first sub-picture is decoded in accordance with a decoding technology wherein loop filtering control at a boundary between the at least two first tile groups is only allowed where each of the at least two first tile groups is rectangular.

2. The method of claim 1, further comprising:
decoding the second sub-picture of the picture, independently from the first sub-picture, using the sub-picture, tile group, and tile partitioning, wherein
the at least one tile of the second sub-picture is a second plurality of tiles.

3. The method of claim 2, wherein
the decoding of the first sub-picture is performed with a different tile scan order than the decoding of the second sub-picture.

4. The method of claim 2, wherein
the decoding of the first sub-picture and the decoding of the second sub-picture is performed using the sub-picture, tile group, and tile partitioning, wherein:
the second plurality of tiles of the second sub-picture are grouped into at least one second tile group, and
no tiles of the at least two first tile groups are located in the at least one second tile group.

5. The method of claim 4, wherein one of the at least two first tile groups is a non-rectangular tile group.

6. The method of claim 1, wherein
the receiving the sub-bitstream includes receiving the coded video stream, the coded video stream including a sequence parameter set (SPS) that includes information on how to partition sub-pictures of the picture, including the first sub-picture and the second sub-picture with their respective identifiers.

7. The method of claim 6, wherein
the coded video stream received includes a picture parameter set (PPS) that includes information on how to partition, arrange, or relocate tiles of the picture, including the at least one tile of the first sub-picture and the at least one tile of the second sub-picture.

8. The method of claim 7, wherein
the coded video stream received includes an active parameter set (APS) that signals adaptive loop filter (ALF) coefficients of the first sub-picture.

9. A decoder for decoding a sub-bitstream of a coded video stream, the coded video stream including a coded version of a first sub-picture and a second sub-picture of a picture, the decoder comprising:

memory configured to store computer program code; and
at least one processor configured to receive the sub-bitstream, access the computer program code, and operate as instructed by the computer program code, the computer program code including:
decoding code configured to cause the at least one processor to decode the first sub-picture of the picture, independently from the second sub-picture, using sub-picture, tile group, and tile partitioning, wherein
(i) the first sub-picture is a first rectangular region of the picture and the second sub-picture is a second rectangular region of the picture, the second rectangular region being different from the first rectangular region,
(ii) the first sub-picture includes a first plurality of tiles, and the second sub-picture each includes at least one tile,
(iii) the first sub-picture and the second sub-picture do not share a common tile,
(iv) the first plurality of tiles of the first sub-picture are grouped into at least two first tile groups, and
(v) the first sub-picture is decoded in accordance with a decoding technology wherein loop filtering control at a boundary between the at least two first tile groups is only allowed where each of the at least two first tile groups is rectangular.

10. The decoder of claim 9, wherein
the decoding code is further configured to cause the at least one processor to decode the second sub-picture of the picture, independently from the first sub-picture, using the sub-picture, tile group, and tile partitioning, and
the at least one tile of the second sub-picture is a second plurality of tiles.

11. The decoder of claim 10, wherein
the decoding code is configured to cause the at least one processor to decode the first sub-picture with a different tile scan order than a tile scan order used to decode the second sub-picture.

12. The decoder of claim 10, wherein
the decoding code is configured to cause the at least one processor to decode the first sub-picture and the second sub-picture using the sub-picture, tile group, and tile partitioning, wherein:
the second plurality of tiles of the second sub-picture are grouped into at least one second tile group, and
no tiles of the at least two first tile groups are located in the at least one second tile group.

13. The decoder of claim 12, wherein one of the at least two first tile groups is a non-rectangular tile group.

14. The decoder according to claim 9, wherein
the decoder is configured to receive the coded video stream that includes the sub-bitstream, the coded video stream including a sequence parameter set (SPS) that includes first information on how to partition sub-pictures of the picture, including the first sub-picture and the second sub-picture with their respective identifiers, and
the decoding code is configured to cause the at least one processor to partition the sub-pictures of the picture according to the first information.

15. The decoder according to claim 14, wherein
the coded video stream includes a picture parameter set (PPS) that includes second information on how to partition, arrange, or relocate tiles of the picture, including the at least one tile of the first sub-picture and the at least one tile of the second sub-picture, and
the decoding code is configured to cause the at least one processor to partition the tiles of the picture according to the second information.

16. The decoder according to claim 15, wherein
the coded video stream includes an active parameter set (APS) that signals adaptive loop filter (ALF) coefficients of the first sub-picture, and
the decoding code is configured to cause the at least one processor to use the APS in decoding the first sub-picture.

17. A non-transitory computer-readable medium storing computer instructions that, when executed by at least one processor, cause the at least one processor to:
decode a first sub-picture of a picture of a coded video stream, independently from a second sub-picture of the picture of the coded video stream, using sub-picture, tile group, and tile partitioning, wherein
(i) the first sub-picture is a first rectangular region of the picture and the second sub-picture is a second rectangular region of the picture, the second rectangular region being different from the first rectangular region,
(ii) the first sub-picture includes a first plurality of tiles, and the second sub-picture includes at least one tile,
(iii) the first sub-picture and the second sub-picture do not share a common tile,
(iv) the first plurality of tiles of the first sub-picture are grouped into at least two first tile groups, and
(v) the first sub-picture is decoded in accordance with a decoding technology wherein loop filtering control at a boundary between the at least two first tile groups is only allowed where each of the at least two first tile groups is rectangular.

18. The non-transitory computer-readable medium of claim 17, wherein
the computer instructions, when executed by the at least one processor, further cause the at least one processor to decode the second sub-picture of the picture, independently from the first sub-picture, using the sub-picture, tile group, and tile partitioning, and
the at least one tile of the second sub-picture is a second plurality of tiles.

* * * * *